(12) United States Patent
Tice et al.

(10) Patent No.: US 6,366,215 B1
(45) Date of Patent: Apr. 2, 2002

(54) COMMUNICATIONS SYSTEMS AND METHODS

(75) Inventors: Lee D. Tice, Bartlett; Steven W. McCuen, Vernon Hills; Edward J. Kurtz, St. Charles; Daniel C. Hawkinson, Elburn, all of IL (US)

(73) Assignee: Pittway Corporation, Chicago, IL (US)

( * ) Notice: Subject to any disclaimer, the term of this patent is extended or adjusted under 35 U.S.C. 154(b) by 0 days.

(21) Appl. No.: 09/205,462

(22) Filed: Dec. 4, 1998

(51) Int. Cl.[7] ........................ G05B 19/02; G08B 26/00
(52) U.S. Cl. ................. 340/825.22; 340/505; 340/514; 340/507; 340/825.5
(58) Field of Search ............................ 340/825.5, 5.2, 340/505, 506, 514, 507, 825.22; 713/202, 200; 700/21, 23

(56) References Cited

U.S. PATENT DOCUMENTS

| | | | |
|---|---|---|---|
| 4,465,904 A | * 8/1984 | Gottsegen et al. | 340/518 |
| 4,538,138 A | * 8/1985 | Harvey et al. | 340/505 |
| 4,772,876 A | * 9/1988 | Laud | 340/506 |
| 4,896,263 A | 1/1990 | Brauninger et al. | 709/222 |
| 4,916,432 A | 4/1990 | Tice et al. | 340/505 |
| 4,951,029 A | * 8/1990 | Severson | 340/506 |
| 4,991,123 A | 2/1991 | Casamassima | 340/525 |
| 5,117,219 A | 5/1992 | Tice et al. | 340/518 |
| 5,195,024 A | * 3/1993 | Kurokawa et al. | 371/19 |
| 5,485,142 A | * 1/1996 | Stute et al. | 340/511 |
| 5,525,962 A | 6/1996 | Tice | 340/506 |
| 5,701,115 A | * 12/1997 | Right et al. | 340/505 |

FOREIGN PATENT DOCUMENTS

| | | |
|---|---|---|
| EP | 0 127 844 A1 | 12/1984 |
| EP | 0 457 940 A1 | 11/1991 |
| GB | 2 107 096 A | 4/1983 |
| GB | 2 118 340 A | 10/1983 |
| GB | 2 216 311 A | 4/1989 |
| GB | 2 254 943 A | 10/1992 |
| GB | 2 268 293 A | 1/1994 |
| WO | WO 87/03406 A1 | 4/1987 |

* cited by examiner

*Primary Examiner*—Donnie L. Crosland
(74) *Attorney, Agent, or Firm*—Rockey, Milnamow & Katz, Ltd.

(57) ABSTRACT

The members of a multi-processor communication system can be loaded with a common set of control programs. Subsequently, the functionality of the various processors can be specified by providing linking information to the respective processors. The linking information specifies which control programs, in which order, are to be executed by a respective processor. Processors can be associated with or bound to a respective system using encrypted control codes. The functional integrity of one or more modules at a respective processor can be verified.

59 Claims, 5 Drawing Sheets

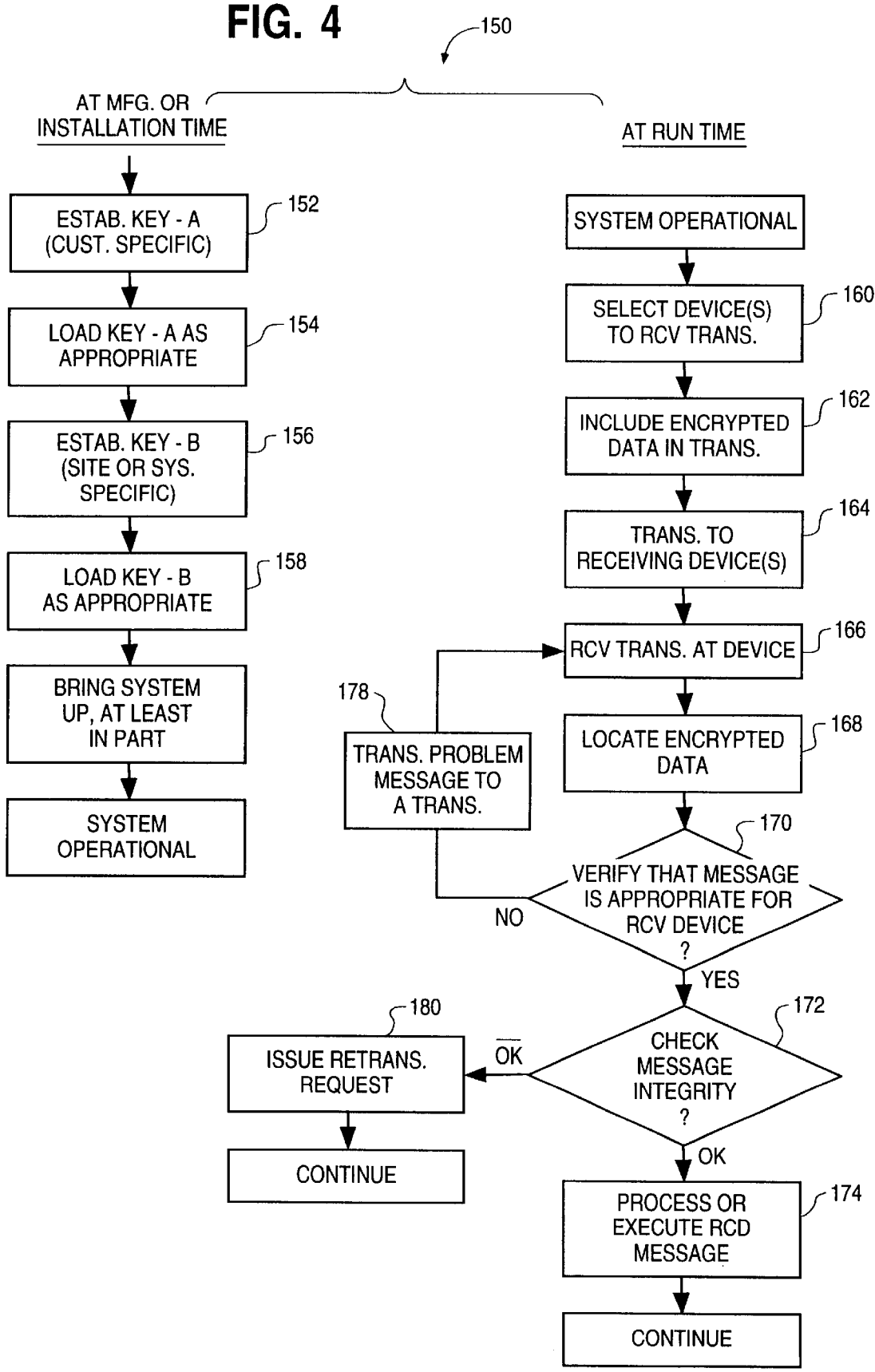

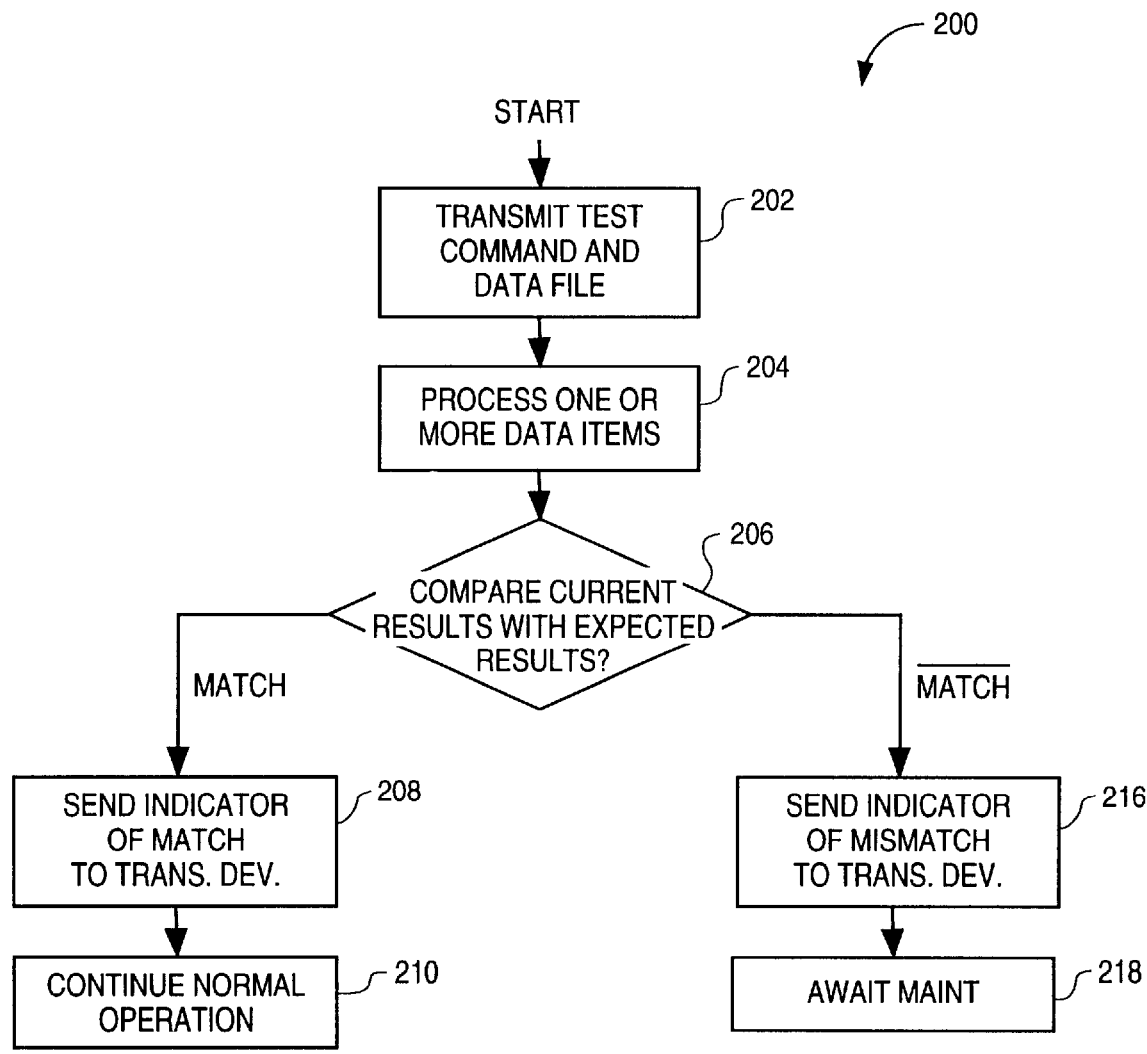

COMMUNICATIONS SYSTEMS AND METHODS

FIELD OF THE INVENTION

The invention pertains to communications systems. More particularly, the invention pertains to communications systems wherein electrical devices in a respective system can be configured to operate with a subset of preloaded software. Additionally, the invention pertains to such systems wherein additional programs or data can be transferred between system devices in protected or encrypted form and wherein the respective device is able to assess the integrity of the received information.

BACKGROUND OF THE INVENTION

Communication systems which incorporate a plurality of substantially independently operating processors are known. One form of such systems is represented by those which are dedicated to monitoring or supervising predetermined regions.

One such communication system is disclosed in Tice et al U.S. Pat. No. 4,916,432 entitled Smoke and Fire Detection System Communication. Another is disclose in Tice U.S. Pat. No. 5,525,962 entitled Communication System and Method. Both of the noted patents are assigned to the assignee hereof and are hereby incorporated herein by reference.

While known systems are useful and have been effective, it would be desirable to more readily configure the functional structure of respective processors to carry out one or more predetermined functions utilizing a common software base. It would also be desirable to be able to provide for secure transmission of information, including programs, between processors and to be able to verify that received files or programs exhibit a predetermined level of integrity.

SUMMARY OF THE INVENTION

In accordance with the present invention, processors in electrical devices which are a part of a multiple processor communication system can be loaded with a variety of executable programs or data files during the manufacturing or installation cycle. At some point during the manufacturing process or at installation, one or more identifiers can be provided to each respective device.

The identifiers can, for example, be stored in non-volatile memory such as EEPROM. The identifiers link together in some fashion, determined at either the manufacturing or installation time, a plurality of the prestored executable programs and perhaps related data files which are included in a universe of programs and data files commonly loaded into the non-volatile memories, such as ROM or EEPROM memories of the respective processors.

In one aspect, the identifiers can be loaded into the device after the device has been coupled to the communications system. In such an instance, the identifier or identifiers can be transmitted from another processor in the system. Alternately, an off-line programming unit can be used to provide the necessary identifier or identifiers to the respective device. The identifier or identifiers enable the respective device to select an appropriate subset of executable programs and/or data files to be used to carry out a predetermined function.

An advantage of the above-described system and method is that during the manufacturing phase, only one type of electrical device need be manufactured to satisfy the requirements of a wide variety of installations. In one aspect, and without limitation, some of the devices can include an ambient condition sensor. Different marketable products can be created by providing different identifiers, which select among the available executable code and available data files, to provide a specific predetermined function using the same hardware.

In yet another aspect, executable code and data files can be received from another processor or processors over an associated wired or wireless communications link in the system. The received information can be transmitted in encrypted form for purposes of providing a higher degree of security.

The received information can be decrypted by the receiving processor. Subsequent to decryption, the structure and information associated with the transmission can be evaluated to insure that it exhibits a predetermined integrity level before being incorporated into the device's universe of executable programs and/or data files.

In another aspect, each device can be preprogrammed with multiple executable routines stored in non-volatile memory. The routines can be combined in various ways in order to form an over-all executable program to carry out a predetermined function. Those routines from the device's universe which are to be combined for purposes of a particular device can be specified by an identifier which links each of the desired routines to at least one other routine of a particular subset.

In another aspect, an additional level of security can be provided. A predetermined password can be stored in each of the devices associated with a particular communications system. A system password can be transmitted along with other information as part of a transmitted message.

The received system password can be compared to the prestored password at each respective device. The received communication can be responded to if the passwords match in some sense. For example, if the received communication is an executable program to be added to a respective device's universe of programs, it can then be stored in non-volatile memory.

If the passwords do not match, audible, or visible indications can be generated so that the mismatch will be addressed. For example, for those communication systems that include some form of a common operator control panel, messages can be produced at the control panel indicating that a particular device has found a mismatch between a transmitted system password and the device's prestored password.

In another aspect, a transmitting device can encrypt a message prior to transmission to increase message security. A receiving device then decrypts the received message prior to evaluating message integrity.

In yet another aspect, a method using codes embedded in the messages can be used to "bind" devices to a specific control unit in a fire alarm, security, or control system. The binding process will prevent potentially inappropriate devices designed for one system from being used in another system without taking into account different hardware and software designed for each system.

In one form, the binding code includes a KEY code, which can be provided to designate a system designer. In addition, a SITE code can be downloaded into the devices for each specific installation.

The KEY can be used to synchronize the device in looking for the SITE code according to a predetermined routine which also may be unique for the system designer. The SITE code is further encrypted with random numbers to make detection and breaking of the code more difficult.

The KEY and SITE codes are stored in protected areas of a device's processor. The SITE code can only be changed by using the old SITE code in combination with the new SITE code. The method of using KEY and SITE codes is also protected and cannot be "read" from the device's processor.

To further make it more difficult to break the codes, they can be embedded in random numbers in a system that generates excessive non-relative numbers and the KEY only occurs randomly. This is an effective process where it is not necessary to establish the correct binding immediately in the system and with every message transmitted.

The operation of the system will require that a specific message be transmitted routinely. This message will contain the numbers in which the codes are embedded.

The devices will power-up and run until a respective device determines that its binding relationship with the control unit is not correct. The device assumes that it has the correct binding until the incorrect binding is detected in the device.

Once the incorrect binding is detected in the device, it can be verified in the next binding check. If the verification confirms that the binding codes are not correct, the device will transmit appropriate mismatch signals or messages to the control unit.

The mismatch state can be reset by a hard reset of the device (i.e. removal and re-insertion or removing power from the line). This will also reset other functions and signal processing algorithms running in the device.

If devices with the incorrect binding codes are connected to a control unit, the time until the mismatch message is generated will be a random time. Therefore, the mismatch indication will provide little information as to the location of the KEY and SITE codes.

In yet another aspect; it may be advantageous to also run a binding confirmation program by a command to the control unit. This can be done in a binding stage during the installation to insure that the proper devices are used with the control unit.

A BIND# code can be downloaded to the devices. The operator then selects the "binding" routine which is then executed. A special message can be used that contains the random number with encrypted numbers. This message can run for a predetermined period of time (i.e. 200 messages) during the "binding" process.

During this time, the control unit insures that the KEY# is transmitted a predetermined number of times (*i.e. 2 times for 200 samples because it falls within the proper probabilities or some number less than the highest random number and higher than the least other random number). The idea is to maintain the randomness of the system.

The devices will expect the KEY# to be received a predetermined quantity of times during the predetermined time period of the binding process. The control unit could alter the random numbers to fill in gaps to try to make the histogram of random number values flat.

At the end of the binding process, any failures will be immediately communicated to the control unit.

In order that the binding of a system cannot be simply copied and used with other control units, the system can continue to run with the encryption method. Later the devices will go into a mismatch state if they mismatch the KEY# and BIND# encrypted codes. A binding process initiated by a command to a selected unit can use a different KEY# than the continual running program. This will further prevent copying of the series of numbers generated by the panel command and then just repeating them during the continual running program.

Message integrity can be checked in accordance with the present invention using a wide range of methodologies. For example, a locally generated check sum of a received decrypted message can be compared to a transmitted check sum generated at the transmitting device. Alternately, an address of a memory location at the receiving device and the expected contents of that address can be transmitted in encrypted form to the receiving device. After decrypting the communication the received contents of the indicated address to the actual contents of the same address can be compared at the receiving device to establish the integrity of the received information.

In yet another aspect, the method can be used to verify downloaded information or to verify that a program is functioning properly. It is possible that a data file can be run through device based signal processing programs and the output compared to an expected value after each data sample. If the data samples match, then the program configuration is unchanged. The check program can also verify that downloaded information is correct.

In one embodiment, the method of verification involves transmitting a register or storage location along with a value. The device will compare the contents of the register location to the value transmitted. If they match, then the device will respond with a transmission indicating that there has been a match. Any register can then be checked at any time to verify that the device is functioning properly.

All comparisons are made in the device. Therefore, the device does not have to send values to the transmitting unit or programmer prior to comparing the expected value to the actual value.

The transmitting unit or programmer can use the verify or check method with groups of devices at the same time. The groups can be formed by location by application or by type of device.

The devices with the matches between their stored value and the predetermined value would respond individually. This response could be in a special message that has a specific time slot for each device to give its response it.

An exemplary process includes:

1. Sending a command to the device to perform a test of a module that executes a signal processing algorithm using values in a data file. The transmitting unit or a programmer can be used to transmit the commands and data values.
2. The first data value is transmitted to the device and the device initializes all values for this test based upon the data value transmitted. Current running values in RAM are being transferred to EEPROM so they are not lost because of carrying out this test.
3. The second data value is transmitted to the device and the device processes that value.
4. The verify message is sent to compare the output of the device processor (in a specific register address) to a value previously determined and included in the message. If the output of the device processor matches this value, a signal is sent to the transmitting unit or programmer that it matches.
5. Another data value is transmitted to the device and the device processes that value.

6. The verify message is sent to compare the output of the device processor (in a specific register address) to a value previously determined and included in the message. If the output of the device processor matches this value, a signal is sent to the control unit or programmer that it matches.

7. #5 and #6 repeat until all data values have been sent. After the data file is complete, if all processed output values are the same as the previously determined values, then the instructions of the tested module exhibit an expected degree of integrity.

8. A command can then be sent to the device to restore to normal operation. The stored running values, which previously transferred to EEPROM, are now transferred back to RAM and the device continues running from the point it was at just before the test was conducted.

The verify message does not have to be sent after every data sample. For example, it may only be sent when a certain predetermined processed output value is expected, such as reaching a pre-alarm or alarm threshold.

Where the electrical unit is an ambient condition detector, this method can be used to verify that algorithms or processing programs stored therein which may have been modified still comply with agency requirements. Standard data files representing sensor response to test fires used for approval or listing can be used.

An alternate process can be used to check the integrity of files stored in ROM, EEPROM or read/write memory. Steps include:

1. Sending a command to a device or devices to determine if the contents of a specific storage or register address in the device matches a predetermined value which is included in the message to the device. If the storage or register value matches the predetermined value, a signal is sent to the transmitting unit or programmer.

2. Step 1 is repeated for all RAM, ROM, or EEPROM storage or register locations that are to be checked.

An alternate process can be used to verify the status of a processor in a device. Steps include:

1. Sending a command to a device or devices to check a specific register address in the device with an AND function to see if any bits in that register match the bits in the predetermined value. Each bit location corresponds to a specific state. Alternately, a separate register location can be used for each state.

2. Step 1 is repeated for all state conditions that are to be checked.

It will be understood that device based software usable to carry out the above described types of integrity tests can be stored in EEPROM. The exact coding used to implement one or more integrity tests is not a limitation of the present invention.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 4 is a block diagram of a program for determining if a file has been received at an appropriate device; and FIG. 5 is a block diagram of a program for verifying the operational integrity of a module resident at a selected device.

DETAILED DESCRIPTION OF THE PREFERRED EMBODIMENTS

Figure 1:
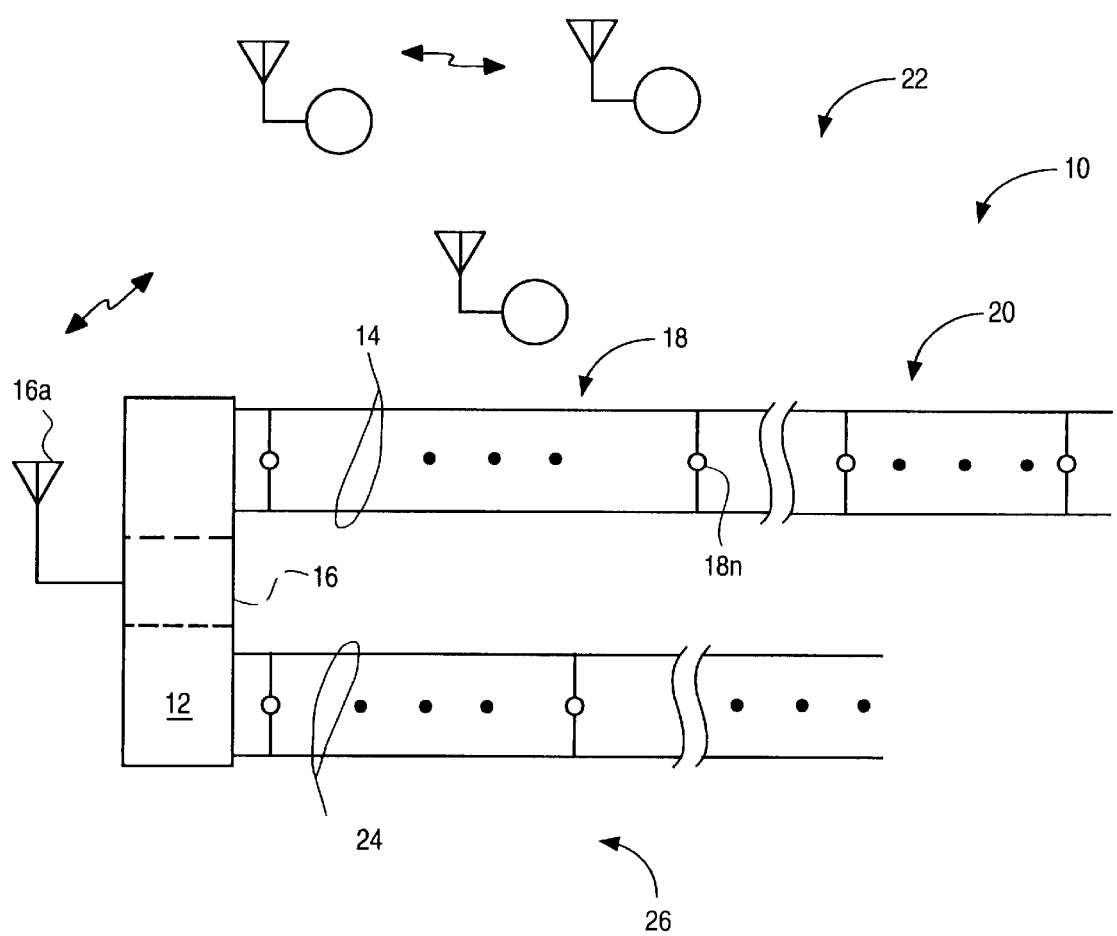
FIG. 1 is a block diagram illustrative of a system of the type which embodies the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a communications system 10 which, in an illustrated embodiment, can be used for monitoring a plurality of conditions in one or more regions to be supervised. The system 10 includes a common control unit 12 which could be implemented as one or more interconnected programmed processors and associated, prestored instructions.

The unit 12 includes an interface for coupling, for example, to a communications medium 14, illustrated in FIG. 1 for exemplary purposes only as an optical or electrical cable. Alternately, the system 10 can communicate wirelessly, such as by RF or infrared, via transceiver 16, illustrated in phantom in FIG. 1, and antenna 16a.

Coupled to medium 14 is a plurality of electrical units or devices such as ambient condition detectors 18 and a plurality of control or function units 20. It will be understood that the relative arrangement of the members of the pluralities 18 and 20 relative to the medium 14 is not a limitation of the present invention. The members of the plurality 18 can include intrusion sensors, position sensors, gas sensors, fire sensors such as smoke sensors, thermal sensors or the like, all without limitation. The members of the plurality 20 can include solenoid actuated control or function implementing units, display devices, printers or the like.

Where system 10 incorporates a wireless communications medium, a plurality 22 of wireless units could be in bidirectional communication with each other and with transceiver 16. The plurality 22 can include, without limitation, ambient condition detectors, as noted above as well as control or function implementation devices without limitation.

Also coupled to the control unit 12 via a medium 24, illustrated for example as a pair of electrical cables, is a plurality 26 of output devices. These could include audible or visible output devices without limitation, speech output devices and the like. The devices 26 are intended to broadcast a message, which might indicate alarm condition, in one or more predetermined regions.

It will be understood that while the illustrated system 10 pertains to monitoring systems, that the particular use of a given multiprocessor system is not a limitation of the invention. The present system and method could, for example, be used with a variety of wired or wireless peer-to-peer communications systems without departing from the spirit and scope of the present invention. Such systems need not include a common control unit such as the unit 12.

Figure 2A:
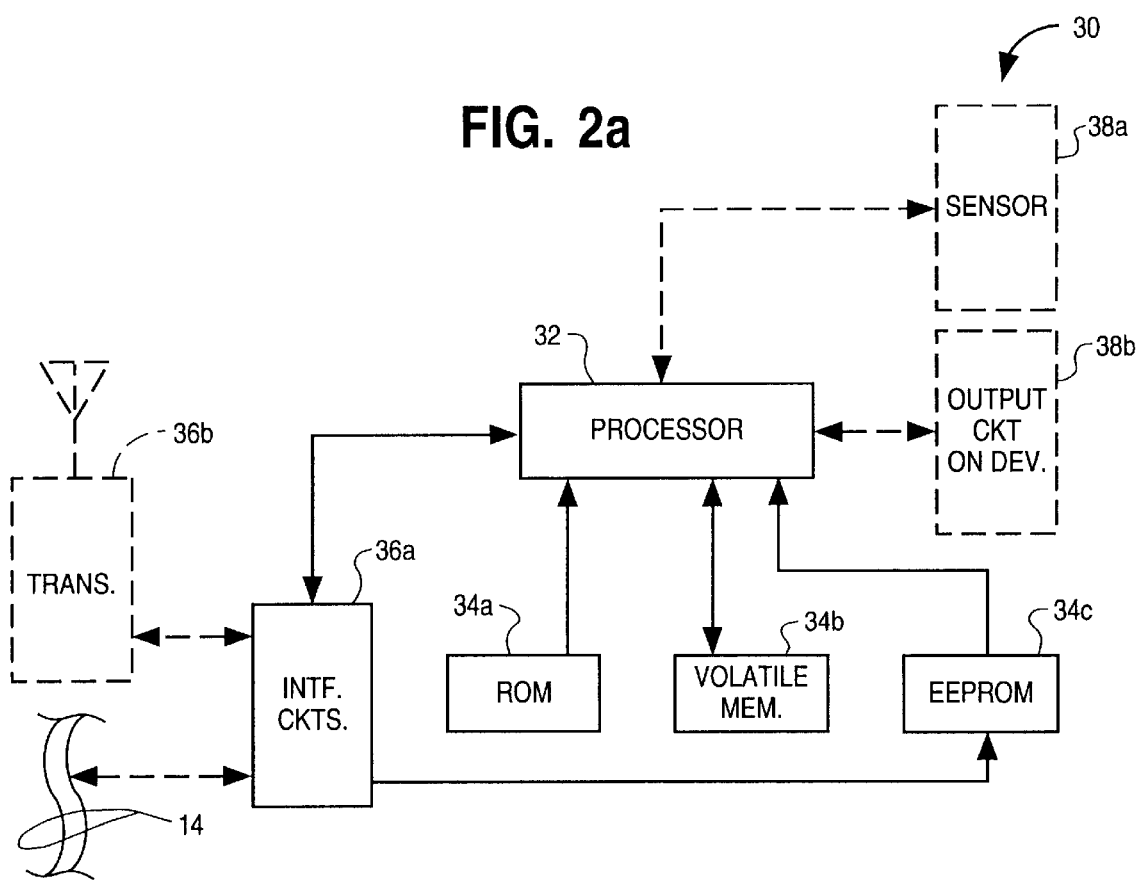
FIG. 2A is a block diagram of a device usable with the system of FIG. 1.

FIG. 2A illustrates a block diagram of an exemplary electrical device 30 which is representative of a member of any one of the pluralities 18, 20 or 22. The device 30 includes a control element which could, for example, be implemented as a programmed processor 32. Processor 32 is in communication with read-only memory 34a, volatile memory, such as random access memory 34b and reprogrammable read-only memory, such as EEPROM, 34c. Processor 32 receives inputs from and transmits outputs via interface circuits 36a.

In one instance, the interface circuits 36a can include drivers for coupling to communication link 14. Alternately, device 30 can include a wireless transceiver, which could be an RF transceiver, illustrated in phantom as 36b.

Device 30 could include one or more input sensors, for example, an ambient condition sensor 38a. Ambient condition sensors include smoke sensors, gas sensors, humidity sensors, position sensors, motion sensors, and other sensors indicative of a particular condition without limitation.

Device 30 can also include output circuits or devices indicated in phantom at 38b. These include displays such as visual displays, audible outputs, control signals for example to actuate solenoids to carry out various types of output functions, all without limitation. Other examples would include printers or modems for communication to other devices via switched telephone lines.

As will be understood by those of skill in the art, processor 32 reads executable commands, programs or modules from the memory units 34a, b, c. Most advantageously, non-volatile memories 34a and 34c are particularly desirable locations for storing control programs, data or other parameters which are not expected to change, stored in memory 34a or which can be expected to change only occasionally, stored in memory 34c. Real time inputs and outputs as well as results of signal processing and the like are intended to be temporarily stored in memory 34b.

It will be understood that the device 30 is a common hardware platform that is representative of a large number of differently functioning devices, having similar hardware, and containing stored therein a common universe of executable program and/or data files. Linking together of a plurality of pre-stored executable files defines the functionality of the respective unit, represented in FIG. 2A by the device 30. This functional specification can be achieved without requiring the loading of a particular combination of executable software or associated data files.

Figure 2B:
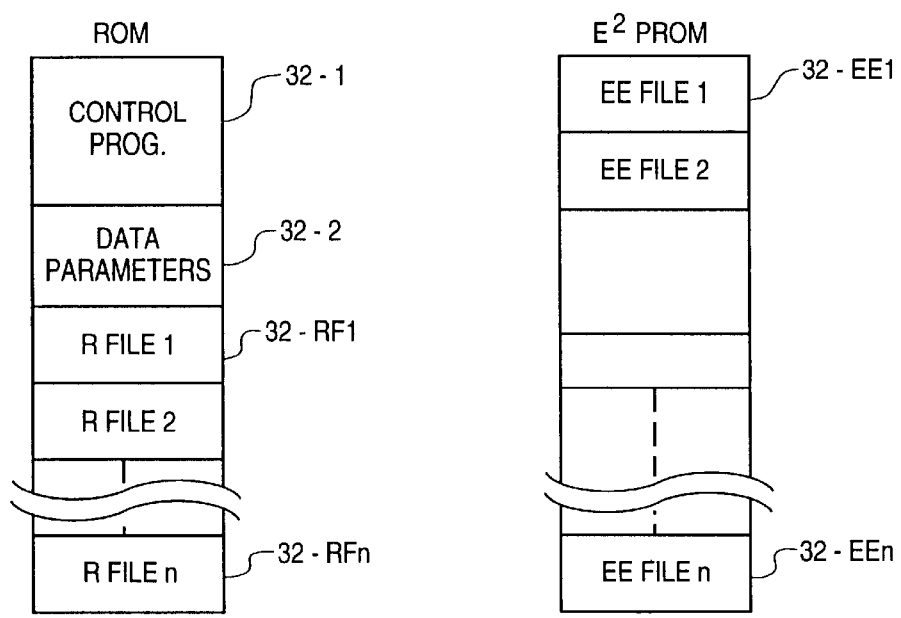
FIG. 2B illustrates memory maps for the device of FIG. 2A.

FIG. 2B illustrates exemplary memory maps for ROM 34a and EEPROM 34c. The ROM memory 34a includes a control program 32-1 to be executed by processor 32. This program would include various common functions to be executed by a large number of different members of the pluralities 18, 20, and 22. Memory 34a also includes data and parameter storage 32-2. This storage includes those data and parameter values to be permanently stored in the device 30.

Read-only memory 34a also includes a plurality of pre-stored files which could include executable code or data 32-RF1 . . . RFn.

Reprogrammable non-volatile memory 34c includes a plurality of pre-stored files which could include programs in executable form as well as data files 32-EE1 . . . EEn.

The present system and method take advantage of the fact that large numbers of common files can be pre-stored in ROM memory 34a and reprogrammable ROM memory 34c in a plurality of devices which the device 30 is representative. Specific device functionality is illustrated in subsequent examples. Specific device functionality can be created on a per device basis by specifying combinations of prestored executable files and data files. The use of such software building blocks makes it possible, via a common hardware platform, to implement a wide variety of functionality.

The files stored in read-only memory 34a can be most conveniently stored therein during the manufacturing process and replicated over a large number of devices. The files stored in reprogrammable read-only memory 34c can be loaded either during manufacture or subsequently after the representative device 30 has been installed in a communication system such as the system 10. In this instance, the executable files and data could be downloaded to device 30 from control element 12 or any other device coupled to communication link 14 or in radio frequency communication with the device being loaded. Alternately, devices, such as the device 30, could be loaded one at a time using an off-line programmer.

Subsequent to the read-only memory 34a and the reprogrammable read-only memory 34c being loaded, a sequence of program specifying or linking indicators can be loaded into the device 30. These can be stored, for example, in reprogrammable read-only memory 34c. This set of indicators specifies a subset of the pluralities of executable programs previously loaded into the memories 34a and c. Depending on the sequence of specified programs, different types of functionality can be provided using substantially the same hardware platform 30.

Another advantage of the present system and method is that if the files in memory 34c are up-dated or modified, a different executable specifying sequence can be loaded into the device 30 to alter its functionality.

The following are provided as examples and are not limitations of the present invention.

The device such as device 30, is preprogrammed with multiple ROM or EEPROM subroutines that can be combined in any order to form the over-all program. These subroutines will be included into the program by CALL statements within the program. The basic program runs through a series of decision stages to determine if a CALL will be used and what subroutine is to be called.

There are other means to form the program other than using CALL statements within the program. GOTO, GOSUB, and other statements will have a similar result. It is also possible that various sequences can be downloaded and the device would choose between different sequences based upon the values processed from the sensors.

This example will have five subroutines named SUB1, SUB2, SUB3, SUB4, and SUB5. The output of each SUBn is compatible with the input of another SUBm. It is possible that a subroutine may be run two or more times depending upon the values downloaded to the device.

The main program 32-1 is a flow through some decision stages that compares a subroutine number with a register that is downloaded with a number to guide the selection of subroutines. Based upon the downloaded number, the program CALLS a predetermined subroutine or module and then goes on in the program sequence.

The program decision registers can be implemented as follows:

→Register A→Register B→Register C→Register D→continue.

The decisions are made as follows:

| | |
|---|---|
| At Register A: | Is the downloaded value 0? If yes, go to Register B |
| | Is the downloaded value 1? If yes, CALL SUB1 and go to Register B. |
| | Is the downloaded value 2? If yes, CALL SUB2 and go to Register B. |
| | Is the downloaded value 3? If yes, CALL SUB3 and go to Register B. |
| | Is the downloaded value 4? If yes, CALL SUB4 and go to Register B. |
| | Is the downloaded value 5? If yes, CALL SUB5 and go to Register B. |
| At Register B: | Is the downloaded value 0? If yes, go to Register C |
| | Is the downloaded value 1? If yes, CALL SUB1 and go to Register C. |
| | Is the downloaded value 2? If yes, CALL SUB2 and go to Register C. |
| | Is the downloaded value 3? If yes, CALL SUB3 and go to Register C. |
| | Is the downloaded value 4? If yes, CALL SUB4 and go to Register C. |
| | Is the downloaded value 5? If yes, CALL SUB5 and go to Register C. |
| At Register C: | Is the downloaded value 0? If yes, go to Register D |
| | Is the downloaded value 1? If yes, CALL SUB1 and go to Register D. |
| | Is the downloaded value 2? If yes, CALL SUB2 and go to Register D. |
| | Is the downloaded value 3? If yes, CALL SUB3 and go to Register D. |
| | Is the downloaded value 4? If yes, CALL SUB4 and go to Register D. |
| | Is the downloaded value 5? If yes, CALL SUB5 and go to Register D. |
| At Register D: | Is the downloaded value 0? If yes, go to Register D |
| | Is the downloaded value 1? If yes, CALL SUB1 and go to continue. |
| | Is the downloaded value 2? If yes, CALL SUB2 and go to continue. |
| | Is the downloaded value 3? If yes, CALL SUB3 and go to continue. |
| | Is the downloaded value 4? If yes, CALL SUB4 and go to continue. |
| | Is the downloaded value 5? If yes, CALL SUB5 and go to continue. |

If the numbers download are 2, 1, 3, and 5, then it will form the program so that it runs the following sequence:

→SUB2→SUB1→SUB3→SUB5→continue.

If the numbers downloaded are 3, 2, 4, and 1, then it will form the program so that it runs the following sequence:

→SUB3→SUB2→SUB4→SUB1→continue.

The advantage of this system and method is that it allows a single device to be programmed with a custom sequence for each application without having to store different combinations of programs in ROM or EEPROM. Algorithms or other signal processing can be uniquely programmed p1) per site or 2) per application or 3) per requirements of the manufacturer.

Recommended sequences can be given to installers of the system for their specific applications of devices. A laser device in a telecommunications room may run the sequence →SUB1→SUB2→SUB3→SUB4→SUB5 and a photo device for use in an office may run the sequence →SUB1→SUB4→SUB5 and a thermal device for use in a kitchen may run the sequence →SUB1→SUB5→SUB2. Each programmed sequence can have different coefficients used in the subroutines dependent upon the type of device and the application. Each SUBn may be a different function. For example SUB1 may be noise removal, SUB2 may be a rate-of-rise calculation, SUB3 may be an automatic adjustment of sensitivity, SUB4 may be an average calculation for drift compensation, etc.

A second example illustrates a plurality of specific executable modules directed to signal processing. These modules may implement very basic calculations:

a. Smoothing subroutine with coefficient defined.
b. Preprocessor subroutine with number of samples defined.
c. Fire characterization routine 1 (simple increases in consecutive samples)
d. Fire characterization routine 2 (average increases in consecutive groups)
e. Fire characterization routine 3 (etc.)
f. Sensor combination routine 1 with exponent defined.
g. Drift compensation routine for photo.
h. Drift compensation routine for ion.
i. Ambient condition compensation.
j. etc.
k. etc.
l. Output % of alarm with sensitively defined.
m. etc.

These will be the building blocks for more complex subroutines formed by the downloaded instructions. For example, the instruction may specify that the program is gbcal which is drift compensation>preprocessor>fire characterization routine 1>smoothing>output % alarm. The order of carrying out the subroutines needs to be flexible. A different order could easily be carried out consisting of bgacl which is preprocessor>drift compensation>smoothing>fire characterization routine 1>output % alarm.

This method requires that all subroutines be predetermined and loaded into the device. However, if the subroutines are simple enough, they may provide sufficient building blocks to construct a more complex subroutine or program. The basic idea is to break the subroutines into as small of parts as possible so that they can be recombined into completely different and new software structure based upon downloaded instructions. If need be, these can be supplemented with additional downloaded files or modules.

The following illustrate examples of combinations of modules to provide different functionality:

| Routine | Application | Software combinations | |
|---|---|---|---|
| 1. | Telecommunications Clean rooms | Auto adjustimg ultra-high sensitivity software | |
| | | a. | Pre-processing |
| | | b. | Smoothing |
| | | c. | Drift Compensation |
| | | d. | Environmental compensation |
| | | e. | Off-set for noise |
| | | f. | Sensitivity .03%/ft – .5%/ft |
| 2. | Office areas no smoking clean | Auto adjusting high sensitivity software | |
| | | a. | Pre-processing |
| | | b. | Smoothing with bypass H |
| | | c. | Drift Compensation |
| | | d. | Sensitivity .5%/ft – 1.0%/ft |

-continued

| Routine | Application | Software combinations |
|---|---|---|
| 3. | | Medium sensitivity 1 |
| | | a. Pre-processing |
| | | b. Smoothing with bypass M1 |
| | | c. Drift Compensation |
| | | d. Sensitivity 1.0%/ft – 1.5%/ft |
| 4. | | Medium sensitivity 2 |
| | | a. Pre-processing |
| | | b. Smoothing with bypass M2 |
| | | c. Drift Compensation |
| | | d. Sensitivity 1.5%/ft – 2.0%/ft |
| 5. | | Medium sensitivity 3 |
| | | a. Pre-processing |
| | | b. Smoothing with bypass M3 |
| | | c. Drift Compensation |
| | | d. Sensitivity 2.0%/ft – 2.5%/ft |
| 6. | | Low sensitivity 1 |
| | | a. Pre-processing with bypass L1 |
| | | b. Smoothing with bypass L1 |
| | | c. Drift Compensation |
| | | d. Sensitivity 2.5%/ft – 3.0%/ft |
| 7. | Dirty factory Garages | Low sensitivity 2 |
| | | a. Pre-processing witn bypass L2 |
| | | b. Smoothing with bypass L2 |
| | | c. Drift Compensation |
| | | d. Sensitivity 3.0%/ft – 3.5%/ft |
| 8. | Smoking rooms bars/pubs | Low sensitivity 3 |
| | | a. Pre-processing witn bypass L3 |
| | | b. Smoothing with bypass L3 |
| | | c. Drift Compensation |
| | | d. Sensitivity 3.5%/ft – 4.0%/ft |

Figure 3:
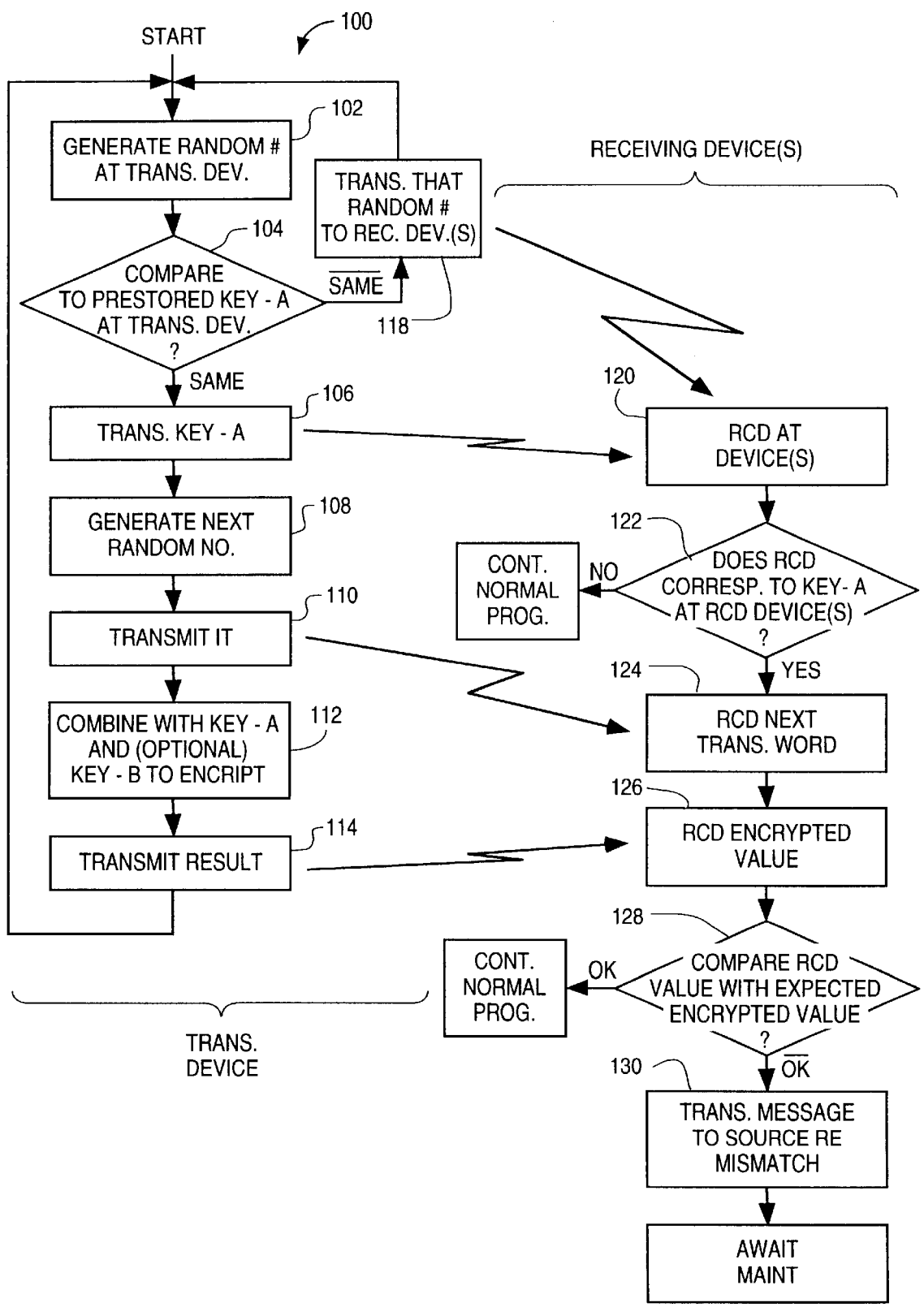
FIG. 3 is a block diagram in accordance with the present invention for determining that devices coupled to the system of FIG. 1 are appropriate thereto.

FIG. 3 illustrates a flow diagram of an encryption process 100 usable for or by the electrical devices or units such as the units of the plurality 18 or 26 to a respective monitoring system 10. The process utilizes two different KEYS. One KEY, KEY-A, is associated with a customer such as a system installer. A second KEY, KEY-B, is associated with a particular installation or site.

The method includes a step 102 of generating a random number at a transmitting or source unit. In a step 104, the generated random number is compared to prestored KEY-A. If the random number is the same as KEY-A, in a step 106, that random number is transmitted to the receiving unit or units. In a step 108, the next random number is generated. In a step 110, it is transmitted to the receiving unit or units. In a step 112, the random number generated at step 108 is combined with KEY-A and KEY-B using any one of a plurality of encryption processes.

Those of skill in the art will understand that in the step 112, a variety of combination processes can be undertaken without departing from the spirit and scope of the present invention. For example, and without limitation, the random number generated in this step 108 can be added to the values of KEY-A and KEY-B. Alternately, the three items could be combined or processed in some other fashion as suitable.

In step 114, the result of the encryption process of this step 112 is transmitted to the receiving unit or units. The transmitting unit then returns to step 102.

In the event that the generated random number does not match KEY-A in step 104, that random number is transmitted to the receiving unit or units in a step 118. When the transmission of KEY-A takes place in step 106, it too will be received at at least one of the receiving devices.

The receiving device compares the received number in a step 122 to determine whether it matches the prestored KEY-A. If not, the device continues to receive incoming messages.

If there is a match, the receiving device recognizes that the random number transmitted in the step 110, when received in the step 124 is to be used in part of the decryption process. In a step 126, the encrypted value transmitted from the transmitting unit in the step 114 is received.

In a step 128, the received value can be compared to an expected value encrypted locally at the receiving unit. If the two values match, the receiving unit or units continue to function normally and return to step 120.

In the event that the two values do not match, in a step 130, a message can be transmitted from the receiving unit or units to the transmitting unit indicating a mismatch. Such mismatch is indicative of the fact that the transmitting unit is not intended to be operated on or with the present system. In addition to transmitting the message in the step 130, the receiving unit can produce a message locally, for example by blinking a light emitting diode in a particular pattern or perhaps generating some form of a audible output signal.

The use of a random number generator at the transmitting unit makes it more difficult to break the codes and determine the value of KEY-A and KEY-B. With respect to the process illustrated in FIG. 3, the values of KEY-A and KEY-B can be stored in protected areas of the EEPROM of the respective receiving processor. If desired, the value of KEY-B can be changed by combining an existing value of KEY-B with a new value of KEY-B and loading same into the unit's processor.

FIG. 4 illustrates a process 150 which can be used for incorporating encrypted identifiers into data files. By incorporating an encrypted element into a data file, a receiving unit can determine if that is a file it should be receiving.

In a step 152, a customer or installer's specific KEY-A is loaded into a system control unit, if present, and devices to be coupled to the system. In a step 154, an installation or site specific KEY-B is similarly loaded into the associated devices, to be used at that installation as well as the associated control unit.

Subsequently, when the system is operational in a step 160, a transmitting device selects the device or devices to receive a transmission. An encrypted representation, for example, of KEY-A and KEY-B is incorporated in a file to be transmitted in a step 162.

The encrypted identifier can be located in a particular location in the file. Alternately, the location of the encrypted identifier can be set by means of a random number which is generated at the transmitting unit and which is also incorporated into the file.

The file with the encrypted identifier is then transmitted in a step 164 to the receiving device or devices which are received same in a step 166. In a step 168, the receiving device determines the location of the encrypted identifier in the file which was received.

In a step 170, the receiving device carries out a decryption process to verify that the encrypted identifier matches an expected value indicating that an appropriate message has been received. If so, in a step 172, the message integrity can be evaluated using, for example, a check sum, or cyclic redundancy code for providing an integrity checking value or the like. Assuming that the received file exhibits an acceptable level of integrity in a step 174, the file can be processed or executed.

In the event that the encrypted received value does not match the expected value in the step 170, a message indicating this mismatch can be transmitted in a step 178 to the transmitting unit. Additionally, in the event that an appropriate message which has been received in the step 170 does not exhibit the predetermined level of integrity in the step 172, in a step 180, a retransmit request can be sent to the transmitting unit.

FIG. 5 illustrates one form of an integrity verifying process 200 in accordance with the present invention. In a step 202, a transmitting unit transmits a test command and a data file which can contain one or more bytes of data to a receiving device. In a step 204, the receiving device processes the received data items using one or more of its prestored programs or modules whose integrity is to be verified. In a step 206, the results of the process of this step 204 are compared with expected results.

Where the local module or software at the device carrying out the tests is functioning properly and conforms to its installed configuration, the comparison process of step 206 will produce a match. A matching indicator can then be transmitted to the originating or transmitting device in a step 208. The receiving device can return to normal operation in a step 210.

In the event that the currently generated results do not match the expected values in the step 206, a mismatch indicator can be sent to the transmitting device in a step 216. The receiving device which may not be functioning properly then can be removed from service for maintenance in step 218.

It will be understood that variations of the above integrity testing process can be carried out without departing from the spirit and scope of the present invention. For example, in another variation, a register or storage location or address can be transmitted to a receiving device along with an expected value. The device can then compare the expected value to the actual value at that location. If the match of the receiving device can then transmit to the transmitting device an indication that there has been a match. The next location can be tested accordingly.

In the above described processes, all comparisons are made at the receiving device. As a result, the receiving device, being tested, does not need to send values to the transmitting device prior to carrying out these comparisons.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A reconfigurable electrical unit comprising:
   an ambient condition sensor;
   at least first and second sets of prestored data sequences;
   circuitry for storing a multi-element identifier for specifying an ordered subset group of data sequences from among the prestored sets for current use in the operation of the electrical unit.

2. An electrical unit as in claim 1 which includes at least four prestored sequences wherein at least some of the sequences include executable structions.

3. An electrical unit as in claim 1 which includes a processor coupled to the prestored sequences for executing an ordered group thereof as specified by that identifier.

4. An electrical unit as in claim 1 wherein the sequences are stored in non-volatile storage circuits.

5. An electrical unit as in claim 4 which includes volatile storage circuitry for receipt of additional sequences.

6. An electrical unit as in claim 1 wherein the sequences are stored as binary bit patterns.

7. An electrical unit as in claim 1 wherein at least one of the specified data sequence includes executable instructions.

8. An electrical unit as in claim 1 wherein the sensor is one of a gas sensor, a smoke sensor, a thermal sensor, a position sensor, a motion sensor and a humidity sensor.

9. An electrical unit as in claim 3 which includes interface circuitry, coupled to the processor, for receiving at least one multi-element identifier for storage wherein the identifier originates at a remote source.

10. An electrical unit as in claim 9 wherein the interface circuitry includes a wireless transceiver.

11. An electrical unit as in claim 10 wherein the transceiver includes circuitry for transmitting radio frequency signals.

12. An electrical unit as in claim 9 which includes a transducer coupled to the processor.

13. An elecrical unit as in claim 7 wherein the executable instructions of the at least one of the specified data sequences are used to control the operation of the electrical unit.

14. An electrical unit as in claim 9 which includes prestored instructions for carrying out an integrity check of information received at the interface from the remote source.

15. An electrical unit as in claim 9 which includes a programmed processor and instructions coupled thereto for carrying out a decrypting function on received information sequences.

16. An electrical unit as in claim 1 which includes a programmed processor having storage circuits wherein the prestored sequences can be stored wherein the processor executes an ordered group of sequences in accordance with the identifier.

17. An electrical unit as in claim 1 wherein the sequences are stored in non-volatile storage circuits.

18. A method of specifying a plurality of prestored sequences, at least some of which include executable instructions, comprising:
   providing a plurality of sequences, at least some of which can be associated with one another to carry out at least one predetermined function including sensing one or more ambient conditions;
   providing an identifier which specifies a subset from the plurality of sequences whereby a first predetermined function comprising carrying out a first ambient condition sensing process can be carried out; and
   carrying out the predetermined function.

19. A method as in claim 18 which includes:
   providing a second identifier which specifies a second subset from the plurality whereby a second predetermined function can be carried out; and carrying out the second predetermined function.

20. A method as in claim 19 which includes carrying out the first function at a first location and carrying out the second function at a second, different location.

21. A method as in claim 19 wherein the second function comprises carrying out a second ambient condition sensing process, which is different from the first ambient condition sensing process.

22. A method as in claim 18 which includes providing security indicia which can be used to determine that at least one of the provided sequences can be properly carried out.

23. A method as in claim 18 which includes providing integrity indicia which can be used to determine that at least one of the sequences has been provided with a predetermined degree of integrity.

24. A method as in claim 18 wherein the security indicia includes an authorizing password.

25. A method as in claim 22 which includes encrypting the security indicia.

26. A method as in claim 23 which includes in the sequence providing step, providing at least one binary sequence usable to assess the integrity of a provided sequence.

27. A method as in claim 26 which includes comparing the provided binary sequence to a pre-stored sequence and carrying out the predetermined function only if the compared sequences exhibit a predetermined relationship.

28. A configurable electrical unit comprising:
an ambient condition sensor;
a plurality of prestored routines; and
circuitry for storing an alterable identifier for specifying an ordered subset group of sequences from among the set of prestored routines for use in controlling the operation of the electrical unit.

29. An electrical unit as in claim 28 wherein the identifier is a multi-element identifier.

30. An electrical unit as in claim 28 wherein the specified routines from the set of prestored routines are executed in the order specified by the identifier.

31. An electrical unit as in claim 28 wherein at least some of the sets of prestored routines include executable instructions.

32. An electrical unit as in claim 28 wherein the identifier, when altered, specifies an altered group of sequences from among the set of prestored routines.

33. An electrical unit as in claim 28 wherein the identifier can be altered by downloading a new identifier into the unit from a separate device.

34. An electrical unit as in claim 33 wherein the downloaded new identifier replaces the previous identifier in the unit.

35. An electrical unit as in claim 33 wherein the separate device is one of a central control unit or a programming unit.

36. An electrical unit as in claim 31 which includes a processor for executing the set of prestored routines.

37. An electrical unit as in claim 28 wherein the identifier and set of prestored routines are stored in non-volatile memory.

38. An electrical unit as in claim 28 wherein the identifier and sequences are stored as binary bit patterns.

39. An electrical unit as in claim 28 wherein additional routines can be downloaded to the unit and included with the prestored routines in the ordered group of sequences as specified by the identifier.

40. An electrical unit as in claim 28 wherein the ambient condition sensor includes at least one of a gas sensor, a smoke sensor, a thermal sensor, a position sensor, a motion sensor, or a humidity sensor.

41. An electrical unit as in claim 28 which includes a wireless transceiver.

42. An electrical unit as in claim 41 wherein the transceiver includes circuitry for transmitting radio frequency signals.

43. A system for monitoring ambient environmental conditions comprising:
one or more ambient condition detectors wherein each detector includes a plurality of prestored data sequences, an identifier having one or more linking indicators for selecting a subset of the prestored data sequences wherein at least some of said selected prestored data sequences include executable instructions, and a processor for executing the executable selected prestored data sequences; and
a programmer communicatively coupled to said one or more ambient condition detectors for supplying the values of the one or more linking indicators.

44. A system as in 43 wherein each of the one or more ambient condition detectors include at least one of a gas sensor, a smoke sensor, a fire sensor, a heat sensor, a humidity sensor, a light sensor, a motion sensor, and a position sensor.

45. A system for monitoring environmental conditions comprising:
one or more configurable sensor devices including a processor having a non-volatile memory space for storing a plurality of executable subroutines and for storing subroutine linkage information including a sequence of one or more program specifying indicators, and an interface circuit for receiving subroutine linkage information and supplying status information; and
a programmer, communicatively coupled to said one or more configurable sensor devices, including an interface circuit for loading subroutine linkage information into the one or more configurable sensor devices;
wherein the processor in the configurable sensor device executes the selected executable subroutines as identified by the subroutine linkage information, and if more than one executable subroutine are selected, the selected executable subroutines are executed in the sequential order determined by the subroutine linkage information.

46. A system as in 45 wherein said programmer is incorporated as part of one or more of a system control unit, a display unit and a monitoring unit.

47. A system as in 45 wherein said programmer is selectively couplable to said one or more configurable sensors, and wherein said programmer is coupled to said one or more sensor devices while loading subroutine linkage information into the one or more configurable sensor devices and is de-coupled from said one or more sensor devices after the loading of the subroutine linkage information into the one or more sensor devices is complete.

48. A system as in 45 wherein the system further comprises one or more signal conductors coupled to the interface circuits of each of the one or more configurable sensor devices and the programmer for communicating the subroutines linkage information from the programmer to the one or more configurable sensor devices.

49. A system as in 48 wherein the one or more signal conductors are wires for transmitting electric signals.

50. A system as in 45 wherein the interface circuits of each of the one or more configurable sensor devices and the programmer include circuitry for electromagnetically communicating the subroutine linkage information between the programmer and the one or more configurable sensor devices.

51. A system as in claim 50 wherein the system further comprises one or more signal conductors coupled to the interface circuits of each of the one or more configurable sensor devices for communicating within the system status information from the sensor devices.

52. A system as in 45 wherein said processor is implemented at least in part as one of a microprocessor, a minicomputer or a computer.

53. A system as in 45 wherein said processor is implemented at least in part as a custom-designed integrated control circuit.

54. A system as in 45 wherein at least one of the one or more configurable sensor devices includes a plurality of sensors.

55. A system as in claim 45 wherein each of the one or more configurable sensor devices includes at least one of a gas sensor, a smoke sensor, a fire sensor, a heat sensor, a humidity sensor, a light sensor, a motion sensor, and a position sensor.

56. A system as in 45 wherein each of the one or more configurable sensor devices is predetermined to internally select the set of subroutines and identify the order in which the subroutines are executed according to the program specifying indicators, thereby forming an executable non-volatile operating software program for use in the one or more configurable sensor devices.

57. A system as in claim 56 wherein when multiple program specifying indicators are defined, multiple subroutines are used to form the executable non-volatile operating software program.

58. A system as in 45 wherein the communications within the system is bi-directional.

59. A system as in 45 further comprising a first communication path for communicating subroutine linkage information between the programmer and the one or more configurable sensor devices, and a second communication path, distinct from the first communication path, for communicating status information from the one or more configurable sensor devices.

* * * * *